United States Patent [19]

Eschwey et al.

[11] 4,233,194

[45] Nov. 11, 1980

[54] WATER-DISPERSED FILM-FORMING LACQUER CONTAINING AIR-DRYING ALKYD RESINS AND AN ETHYLENE OXIDE ADDUCT OF AN UNSATURATED ALIPHATIC-SUBSTITUTED PHENOL

[75] Inventors: Helmut Eschwey, Düsseldorf-Benrath, Fed. Rep. of Germany; Joachim Galinke, deceased, late of Langenfeld, Fed. Rep. of Germany, by Renate Galinke nee Jansen, heir; Norbert Wiemers, Monheim-Baumberg, Fed. Rep. of Germany

[73] Assignee: Henkel Kommanditgesellschaft auf Aktien (Henkel KGAA), Düsseldorf-Holthausen, Fed. Rep. of Germany

[21] Appl. No.: 966,367

[22] Filed: Dec. 4, 1978

[30] Foreign Application Priority Data

Dec. 5, 1977 [DE] Fed. Rep. of Germany ....... 2754091

[51] Int. Cl.³ .................. B32B 9/00; B32B 17/10; C09D 3/64
[52] U.S. Cl. .................. 260/22 A; 260/29.2 E; 260/29.2 UA; 428/430; 428/480
[58] Field of Search ............ 260/22 A, 22 T, 29.2 E, 260/29.2 UA, DIG. 9; 528/163; 428/430, 480

[56] References Cited

U.S. PATENT DOCUMENTS

| | | | |
|---|---|---|---|
| 2,985,622 | 5/1961 | Leppert | 528/1 |
| 3,077,459 | 2/1963 | Hershey et al. | 260/22 A |
| 3,804,787 | 4/1974 | Nicks et al. | 260/22 R |
| 3,879,327 | 4/1975 | Burke | 260/29.2 E |
| 4,051,089 | 9/1977 | Tobias et al. | 260/29.2 UA |
| 4,122,051 | 10/1978 | Friberg et al. | 260/22 A |

FOREIGN PATENT DOCUMENTS 39-14627  7/1964  Japan .......................... 528/1

*Primary Examiner*—Ronald W. Griffin
*Attorney, Agent, or Firm*—Hammond & Littell, Weissenberger and Muserlian

[57] ABSTRACT

A water-dispersed film-forming vehicle suitable for lacquers is disclosed. The vehicle consists of an aqueous dispersion of an air-drying, low acid-number alkyd resin dispersed by the use of a nonionic surfactant consisting of an adduct of ethylene oxide units onto a phenolic compound substituted by a hydrophobic aliphatic radical containing olefinic double bonds, preferably, containing 12 to 18 carbon atoms and 1 to 5 double bonds. The adduct includes 5 to 40 ethylene oxide units per mol. The water-based dispersion diluent in which the alkyd resin is dispersed may include pigments, siccatives for the alkyd drying resin and optionally processing aid solvents.

9 Claims, No Drawings

WATER-DISPERSED FILM-FORMING LACQUER CONTAINING AIR-DRYING ALKYD RESINS AND AN ETHYLENE OXIDE ADDUCT OF AN UNSATURATED ALIPHATIC-SUBSTITUTED PHENOL

FIELD OF THE INVENTION

The present invention relates to aqueous dispersions of air-drying alkyd resins suitable as film-formers for lacquer vehicles. More particularly, such aqueous dispersions are based on such resins dispersed by the aid of nonionic surfactants which are adducts of ethylene oxide with compounds having hydrophobic moieties.

BACKGROUND OF THE INVENTION

It is known to use air-drying alkyd resins having high acid numbers for the production of aqueous lacquers and other film-forming agents. Such alkyd resins, having high acid numbers, have good water solubility in the form of their amine salts. Such alkyd resins and film-forming systems based thereon, have the disadvantages of unsatisfactory resistance to water and water vapor, and require considerable amounts of volatile amines and solvents for satisfactory dispersion. While drying and curing, the film layers formed from such high acid number resins release the amines and solvents. Such amines and solvents are undesirable sources of pollution to the adjacent atmosphere. To reduce such pollution it is often necessary to carry out the curing steps in specially designed apparatus to trap or recover these toxic substances. Such apparatus is expensive and the cost of such apparatus often overshadows any savings from the recovered solvents.

It is also known to modify film-forming materials by the incorporation of hydrophilic groups, particularly, polyethylene glycol chains into the resin molecule so that self-emulsifying alkyd resins or melamine resins result. It is also known that even without direct incorporation into the resin molecule, it is possible to use the adducts of ethylene oxide with some fatty alcohols, as low molecular weight, nonionic emulsifiers. In such cases, however, portions of a hydrophilic radical remain active in the film. The resultant films are susceptible to water penetration. A marked reduction in the hardness of the resultant film is also noted.

OBJECTS OF THE INVENTION

An object of the present invention is the development of water-dispersed or dispersible aqueous film-forming vehicles suitable for lacquers which are superior to the known prior art systems.

A further object of this invention is to provide films which yield coatings which have characteristic properties of high hardness, vastly improved resistance to water penetration and moisture diffusion.

Another object of the present invention is the development of such aqueous film-forming systems which can be used to coat varied substrates including glass, wood, metals, etc., and which do not use objectionable amounts of polluting volatile solvents.

A further object of this invention is to provide a water-dispersed film-forming vehicle suitable for lacquer bases and such lacquers comprising a water-insoluble air-drying alkyd resin, surfactants consisting essentially of adducts of ethylene oxide units onto a phenolic compound substituted by a hydrophobic aliphatic moiety containing olefinic double bonds, dispersed in a water-based dispersion diluent.

These and other objects of the present invention will become more apparent as the description of the invention is elaborated below.

THE INVENTION

The above objects have been achieved by the development of water-dispersed film-forming vehicles comprising water-insoluble air-drying alkyd resins; surfactants consisting essentially of adducts of ethylene oxide units onto a phenolic compound substituted by a hydrophobic aliphatic radical containing olefinic double bonds and an aqueous-based dispersion diluent.

The nonionic surfactant consists of at least one adduct of ethylene oxide units onto phenols substituted by hydrophobic aliphatic radicals containing double bonds. The aliphatic groups of these compounds contain from 12 to 18 carbon atoms and 1 to 5 olefinic double bonds. The adducts include 5 to 40 ethylene oxide units per mol of the adduct compound and preferably 5 to 25 mols of ethylene oxide to one mol of the aliphatically substituted phenol.

The water-dispersed film-forming vehicle contains air-drying alkyd resins having film-forming properties which are water-insoluble and have an acid number in the range of 5 to 40 and a fatty acid content in the range of 25 to 80% by weight of said resin calculated as fatty acid glyceride. Preferred among such resins are those which have an acid number in the range from 5 to 25 and optimally about 10±2 and, a preferred fatty acid content in the range of 45 to 70% by weight, calculated as fatty acid glyceride.

The major portion of the dispersal diluent is, of course, water.

The phenolic compounds are known as such, where the generic groups are combined under the collective name of cardanol. This group contains the components of the cashew nutshell oil, anacardic acid (I), and cardol (II), as well as the decarboxylation product of anacardic acid, the actual cardanol (III), (see J. Stut, Farbe und Lack, 71 (12): 1027, 1965).

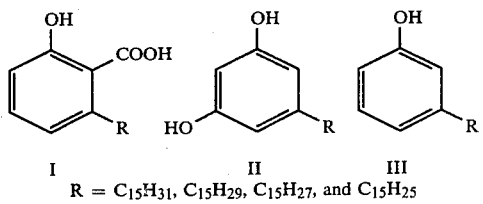

I  II  III
R = $C_{15}H_{31}$, $C_{15}H_{29}$, $C_{15}H_{27}$, and $C_{15}H_{25}$ The R group, the hydrophobic part of the surfactant which contributes to its air-drying character, is characterized by an iodine number of 150 to 400, preferably 200 to 350. The iodine number is subject to fluctuations in the case of the cashew nutshell oil since it is a natural product.

The addition of ethylene oxide to the above-mentioned phenolic compounds proceeds in a well-known manner, under the catalytic influence of alkalis such as alkali metal hydroxides, for example, sodium or potassium hydroxide, or alkali metal lower alcohols, such as sodium or potassium methylate or butylate.

For the preparation of the dispersions, according to the invention, the emulsifying agents are used in an amount of approximately 0.5% to 10%, preferably 1 to 8% by weight, calculated for the total amount of resin.

The determination of the quantity of surfactant to be used in the aqueous dispersions of this invention is made in accordance with empirical considerations rather than purely stoichiometric calculation. One skilled in the art can determine the desirable amount of surfactant to be added by routine experimentation based upon the nature of the final lacquer product and the viscosity desired. An economic consideration is the degree of water dispersion of the vehicle as furnished to the user. If insufficient water is used, the vehicle is much too viscous for convenient dilution prior to application to the substrate to be coated. Too much water, of course, affects the economics of shipping and may not have sufficient viscosity or spreading characteristics for certain modes of application. However, the preferred range for each surfactant-resin combination can easily be determined once a decision has been made as to a marketable viscosity and the amount of water in which the product is to be dispersed to present an acceptable product. Often, special consideration is given to the manner of application for the lacquer. The lacquers for spray application usually contain more surfactant to facilitate the greater dilution suggested for sprays.

For the film-forming element of the water-dispersible vehicles, those alkyd resins that are water-insoluble or, cannot be diluted with water upon amine neutralization, are used.

The term, air-drying alkyd resins, as used herein, refers to those alkyd resins which can be converted to the cross-linked state by the action of oxygen, preferably, atmospheric oxygen. The rate of such "drying", "curing" or crosslinking of these resins is subject to additional control by the presence of siccatives.

The suitable air cross-linkable alkyd resins, which are the useful film formers for the present invention, are those which until now because of their water-insolubility were normally applied via organic solvents. These suitable alkyd resins have an acid number of about 5 to 40, preferably, from about 10 to 25. Their fatty acid content must be between 25% and 80% by weight, and, preferably, should be between 45% and 70% by weight, as is generally the case with the water-insoluble air-drying alkyd resins. The percentage is calculated as the fatty acid glyceride. In general, enough resin is used so that the finished aqueous dispersion of this invention contains approximately 30% to 70% of resin solids. Again, the exact percentage is determined by the commercial requirements for marketable viscosity and dilution of the dispersion.

In general, the film-forming lacquer vehicles, according to this invention, contain:

| Air-drying resins | 30 to 70% |
| Nonionic surfactant adduct | 0.15 to 7% |
| Water-based diluent | to 100% |

Thus, more particularly, the water-dispersed film-forming vehicles of this invention are preferably comprised of:

(a) from 30 to 70% by weight based upon the total weight of the aqueous dispersion of at least one air cross-linkable alkyd resin;

(b) from 0.15% to 7% by weight of said aqueous dispersion of the nonionic surface-active compound which is the addition product of 5 to 25 ethylene oxide units per mol of a hydrophobic aliphatic-substituted phenol selected from the group consisting of cardanols from cashew nutshell oils;

(c) the remainder being a water-based vehicle comprising an aqueous liquid-phase containing primarily water and, optimally, admixed pigments, siccatives and adjuvant solvents.

The production of the dispersions of this invention is effected in accordance with conventional dispersing or emulsifying methods at temperatures between about 20° and 100° C., and at the temperatures above 100° C., optionally, under pressure. To the water dispersion may be added water-miscible or, at least, partly water-soluble organic solvents, such as ethylene glycol monobutyl ether, lower alcohols, such as butanol and the like in minor amounts. Also, advantageously, small amounts of organic solvents not miscible with water, such as test benzene or xylene, may be employed. Since these organic solvents are processing aids useful in the steps of properly subdividing the alkyd resins, pigments or driers, they are used in proportions which do not exceed 15% and, preferably, 10% by weight of the final dispersion.

Occasionally, it is useful for purposes of stabilization to add to the dispersions small amounts of volatile, basic nitrogen compounds such as ammonia or secondary or tertiary aliphatic amines including dimethylethanolamine, triethylamine, diethylamine, butylethylamine and the like. These compounds should not exceed a quantity of 2% by weight of the final aqueous dispersion.

The dispersions, in accordance with this invention, comprise oil-in-water emulsions, which can be diluted to an unlimited extent with water. By contrast to the numerous known water-dilutable, amine-neutralized alkyd resins systems, the dispersions of this invention, even in the absence of auxiliary organic solvents, show no maximum in the dilution curve, i.e., no viscosity anomaly (see, e.g., E. Huttman et al. *Plaste und Kautschuk* (Plastics and Rubber) 17 (1970) 202).

The dispersions according to this invention can be pigmented by conventional methods and, preferably, mixed with siccatives.

The dispersions, according to the invention, can be pigmented by conventional methods and mixed with siccatives. In the absence of organic adjuvant solvents, water-soluble or conventional, commercially available dry substances that can be emulsified in water are used to advantage; in the presence of nonpolar organic adjuvant solvents, conventional metal salts such as naphthenates and/or octoates of heavy metals such as lead and cobalt or similar substances can be used also.

The dispersions of this invention can be used for the coating of varied substrates and materials such as wood, glass, or metals including aluminum, iron, steel and the many commonly lacquered alloys. In addition, because of the good resistance to moisture, the films of this invention can be used to protect coated substrates from the ravages of moist air as well as from complete immersion in water. Such air-cured, coated substrates are within the ambit of this invention.

After air-drying, the films of this invention show excellent water resistance as well as a high degree of hardness. With respect to water resistance they are superior to the conventional lacquer emulsions based on inactive emulsifying agents and are superior to the water-dilutable amine-neutralized lacquer systems based on alkyd resins having high acid numbers.

It must also be emphasized that the resins resulting from the present invention have the advantage of requiring no volatile organic solvents, amines or ammonia, but if present, they are present in extremely low amounts, thus easily complying with the present anti-pollution standards.

The invention is further illustrated by the Examples which follow. These Examples are preferred embodiments of the invention and are not to be construed in limitation thereof. Included therein are the best modes of practice to meet specific criteria.

EXAMPLES

The following alkyd resins, marked I–III, were used for the preparation of the dispersions, according to the invention:

Alkyd Resin I

Alkyd resin modified with tall oil, having an oil content of 66% by weight, a content of phthalic acid anhydride of 24% by weight, as well as an acid number of 10.

Alkyd Resin II

Alkyd resin modified with linseed oil, having an oil content of 50% by weight, a phthalic acid anhydride content of 32% by weight, as well as an acid number of 10.

Alkyd Resin III

Alkyd resin modified with soybean oil, having an oil content of 60% by weight, a phthalic acid anhydride content of 28% by weight, as well as an acid number of 12.

Comparison Alkyd Resin (a)

Alkyd resin modified with vegetable fatty acids, having an oil content of 50% by weight, a phthalic acid anhydride content of 19% by weight, as well as an acid number of 48. Comparison alkyd resin (a) was in the form of a 63% solution in ethylene glycol monobutyl ether.

The emulsifying agents to be used, according to the invention, were prepared by reacting a mixture consisting of 90% by weight of cardanol and 10% by weight of cardol and having an iodine number of 346, with various amounts of ethylene oxide in the presence of 2% by weight of sodium methylate for 5 hours at 165° C. and 10 atmospheres.

The number of mols of ethylene oxide used for 1 mol of phenolic compound is shown in Table 1, below, in dependence on the emulsifying agents A to E.

TABLE 1

| Emulsifying agent | Mols-ethylene oxide |
|---|---|
| A | 5 |
| B | 7.5 |
| C | 10 |
| D | 15 |
| E | 25 |

A reaction product of 1 mol of nonyl phenol and 15 mols of ethylene oxide, which was prepared under the same conditions, was used as comparison emulsifying agent (a).

Preparation of the Dispersions

Alkyd resin, emulsifying agent, water, nitrogen base and, if desired, the organic adjuvant solvent (the test benzene used had a boiling range of 145°–200° C.) were added together and heated to 80° C. Then, the mixture was dispersed, using a high-speed agitator (10,000 rpm). The dispersions were mixed at room temperature with 0.1 gm of cobalt naphthenate and 0.9 gm of lead naphthenate (calculated as Co and Pb, respectively), with respect to solid resin. The dispersions, according to the invention, which could be diluted with water at any ratio, had the following composition:

EXAMPLE 1

|  | Parts by weight |
|---|---|
| alkyd resin I | 39.0 |
| emulsifying agent A | 1.0 |
| ammonia - 36% by weight, H$_2$O solution | 1.0 |
| test benzene | 10.0 |
| water | 49.0 |

EXAMPLE 2

| alkyd resin I | 58.0 |
|---|---|
| emulsifying agent | 2.0 |
| triethylamine | 1.5 |
| water | 38.5 |

EXAMPLE 3

| alkyd resin II | 49.0 |
|---|---|
| emulsifying agent C | 1.0 |
| triethylamine | 1.0 |
| test benzene | 5.0 |
| water | 44.0 |

EXAMPLE 4

|  | Parts by weight |
|---|---|
| alkyd resin II | 48.5 |
| emulsifying agent D | 1.5 |
| triethylamine | 1.0 |
| test benzene | 15.0 |
| water | 34.0 |

EXAMPLE 5

| alkyd resin III | 39.0 |
|---|---|
| emulsifying agent E | 1.0 |
| triethylamine | 1.0 |
| water | 59.0 |

COMPARISON EXAMPLE I

| alkyd resin I | 49.0 |
|---|---|
| comparison emulsifying agent (a) | 1.5 |
| triethylamine | 1.0 |
| test benzene | 15.0 |
| water | 35.5 |

COMPARISON EXAMPLE II

| comparison alkyd resin (a) | 50.0 |
|---|---|
| triethylamine | 4.5 |

```
                          -continued
    ethylene glycol monobutyl
              ether                          29.0
              water                          16.5
```

The films prepared from the dispersions were tested by applying them to glass plates and storing these coated plates for 7 days in an air-conditioned room at 20° C. and 60% relative humidity. The thickness of the dry film was 30 μm. The film hardness was determined at intervals of 24 hours by measuring the pendulum hardness according to DIN 53 157.

The water resistance was determined by immersing the films, dried for 7 days, in distilled water of 40° C., and examining them at intervals of 1, 5, 10 and 24 hours for the formation of blisters and for signs of peeling. The examination was based on a 5-point system:
1—film unchanged;
2—beginning of formation of blisters at edge;
3—slight formation of blisters on entire film surface;
4—strong formation of blisters on entire film surface;
5—film is detached from substrate.

The pendulum hardness and the behavior toward distilled water, measured according to the scale above, are compiled in the Table 2.

TABLE 2

| Example | Pendulum Hardness (DIN 53 157) | | | Water Resistance | | | |
|---|---|---|---|---|---|---|---|
| | Day 1 | Day 3 | Day 7 | 1 h | 5 h | 10 h | 24 h |
| 1 | 26 | 45 | 58 | 1 | 1 | 1 | 2-3 |
| 2 | 22 | 43 | 53 | 1 | 1 | 1 | 2 |
| 3 | 20 | 41 | 54 | 1 | 1 | 1-2 | 2-3 |
| 4 | 23 | 40 | 52 | 1 | 1 | 1-2 | 2-3 |
| 5 | 24 | 40 | 54 | 1 | 1 | 1-2 | 2-3 |
| Comparison i | 18 | 25 | 39 | 1 | 2 | 3 | 4 |
| Comparison ii | 25 | 40 | 54 | 1 | 2-3 | 4 | 5 |

The test results in Table 2 show the clear superiority of the films prepared using the film-formers of the invention over the films prepared, using the materials of the prior art. All films prepared in accordance with the present invention were clear and shiny, but with the material from comparative Example (ii), the film was dull-to-lightly cloudy. The above results further demonstrate that the films of the present invention are considerably superior to those obtained according to the prior art in both pendulum hardness and water resistance.

The preceding specific embodiments are illustrative of the practice of the invention. Unless, otherwise specified, all parts and percentages herein, are by weight.

It is to be understood that other expedients and materials known to those skilled in the art or described herein, may be employed without departing from the spirit of the invention or the scope of the appended claims.

We claim:
1. An aqueous-dispersed film-forming vehicle suitable for lacquers and lacquer binding agents comprising a content of:
(a) at least one water-insoluble air-drying alkyd resin;
(b) at least one nonionic surfactant consisting essentially of an adduct of ethylene oxide onto an aliphatic-substituted phenolic compound selected from the group consisting of cardanols having the following formulae:

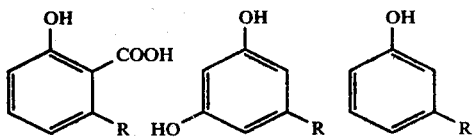

where R is a mixture of $C_{15}H_{31}$, $C_{15}H_{29}$, $C_{15}H_{27}$ and $C_{15}H_{25}$, said adduct containing 5 to 40 ethylene oxide units per mol of the phenolic compound; and
(c) an aqueous dispersion medium.

2. The aqueous-dispersed film-forming vehicle according to claim 1 wherein said water-insoluble air-drying alkyd resin has an acid number in the range 5 to 40, and a fatty acid content, calculated as fatty acid glyceride, in the range of 25 to 80% by weight.

3. The aqueous-dispersed film-forming vehicle according to claim 2 wherein said resin has an acid number in the range from 5 to 25 and a fatty acid content, calculated as fatty acid glyceride, in the range 45 to 70% by weight.

4. The aqueous-dispersible film-forming vehicle according to claim 1 wherein said vehicle contains:
air-drying alkyd resins—about 30 to 70%
surfactant adducts—about 0.15 to 7%
water-based diluent q.s.—to 100%.

5. The aqueous-dispersed film-forming vehicle according to claim 1 wherein said aqueous dispersion diluent contains water and from 0 to 15% of the dispersion of processing aids selected from the group consisting of ethyleneglycol monobutyl ether, butanol, test benzene, xylene, and from 0 to 2% of the dispersion of basic nitrogen compounds selected from the group consisting of ammonia, triethylamine and dimethylethanolamine.

6. The aqueous-dispersed film-forming vehicle according to claim 1 additionally containing coloring pigments and siccatives useful for controlling the drying rates of air-drying alkyd resins.

7. The aqueous-dispersed film-forming vehicle according to claim 1 diluted with additional water to a consistency suitable for application as a lacquer.

8. The hard, water-resistant film of lacquer remaining after the evaporation of the water and the air-drying of the resin from deposited films of said diluted vehicle according to claim 7.

9. Composites comprising a substrate coated with a layer of the film, according to claim 8.

* * * * *